(12) United States Patent
Hughes (10) Patent No.: US 7,059,605 B1
(45) Date of Patent: Jun. 13, 2006

(54) HEELING/HEADING ROPING PRACTICING SYSTEM

(76) Inventor: Gabriel T. Hughes, P.O. Box 852, Avondale, AZ (US) 85323

( * ) Notice: Subject to any disclaimer, the term of this patent is extended or adjusted under 35 U.S.C. 154(b) by 0 days.

(21) Appl. No.: 10/827,936

(22) Filed: Apr. 19, 2004

Related U.S. Application Data (60) Provisional application No. 60/498,844, filed on Aug. 29, 2003, provisional application No. 60/463,551, filed on Apr. 17, 2003.

(51) Int. Cl.
*F41J 9/02* (2006.01)
*A63B 68/00* (2006.01)

(52) U.S. Cl. ...................... 273/369; 273/338

(58) Field of Classification Search ........ 273/367–370, 273/338, 339, 359; 119/29
See application file for complete search history.

(56) References Cited

U.S. PATENT DOCUMENTS

| | | | | |
|---|---|---|---|---|
| 3,776,553 A * | 12/1973 | Kelton | | 273/339 |
| 4,451,045 A * | 5/1984 | Fesmire | | 273/338 |
| 4,498,676 A * | 2/1985 | Runner | | 273/336 |
| 4,640,515 A * | 2/1987 | Rhine | | 273/339 |
| 4,874,179 A * | 10/1989 | Henderson | | 273/338 |
| 4,960,076 A * | 10/1990 | Snorgrass et al. | | 119/839 |
| 4,995,618 A * | 2/1991 | Panzner | | 273/367 |
| 5,009,432 A * | 4/1991 | Richard | | 273/339 |
| 5,080,373 A * | 1/1992 | Jones | | 273/338 |
| 5,286,032 A * | 2/1994 | Spencer | | 273/339 |
| 5,709,386 A * | 1/1998 | Nelson | | 273/370 |
| 6,736,399 B1 * | 5/2004 | Copenhaver | | 273/339 |
| 6,875,117 B1 * | 4/2005 | Ransil et al. | | 472/119 |

* cited by examiner

*Primary Examiner*—Mark S. Graham
(74) *Attorney, Agent, or Firm*—Stoneman Law Offices, Ltd.; Martin L. Stoneman; Benjamin K. Erlick (57) ABSTRACT

A compact lightweight portable heeling/heading rope practicing system with a detachable head portion that provides automated movement simulating the movement of bovine legs using pendular motion driven by a hand cranked spring mechanism and/or electric powered motor, and a method of promoting the sale of such rope practicing systems in conjunction with events in which potential purchasers already participate.

13 Claims, 10 Drawing Sheets

HEELING/HEADING ROPING PRACTICING SYSTEM

CROSS-REFERENCE TO RELATED APPLICATION

The present application is a continuation-in-part of related prior provisional applications: Ser. No. 60/498,844 filed Aug. 29, 2003, entitled "HEELING/HEADING ROPING PRACTICING SYSTEM"; and Ser. No. 60/463,551 filed Apr. 17, 2003, entitled "HEELING/HEADING ROPE PRACTICING SYSTEM"; the contents of which are incorporated herein by this reference and are not admitted to be prior art with respect to the present invention by their mention in this cross-reference section.

BACKGROUND

This invention relates to providing a system for assisting a user in practicing roping skills, particularly heeling and heading roping skills. For example, team roping is a timed contest in a rodeo that features two cowboys competing together: a "header" and a "heeler". The header ropes the steer's head (ideally the horns), dallies (wraps the end of the rope around his saddle horn) and pulls the steer with the rope. The heeler then ropes the back legs of the steer, dallies, and stops his horse. When the heeler catches and dallies, and both ropes are tight, the header stops and turns his horse to face the heeler, and the clock is stopped. The team with the fastest time wins the competition.

To be competitive, those participating in such competitions must practice to develop a high degree of skill in throwing the rope. For many reasons, it is often inconvenient or impractical to practice with a live steer. In the past, different kinds of mechanical roping steers have been developed to assist in roping training. However, the devices of the past which provide automated movement simulating a steer (to provide a more valuable training experience) have been complicated, bulky, and cumbersome to assemble and disassemble. In the past, mechanically-powered roping practice systems have required nearby sources of electric power.

Further, in the past, providers of roping practice systems have not provided much incentive to purchase their systems. Attempts to advertise and sell roping practice systems by traditional means have been relatively ineffectual.

OBJECTS AND FEATURES OF THE INVENTION

A primary object and feature of the present invention is to provide a heeling/heading rope practicing system which assists a user in practicing heeling/heading roping skills.

It is a further object and feature of the present invention to provide such a system that provides automated movement simulating a steer. It is a further object and feature of the present invention to provide such a system that does not require an external source of electricity for mechanized movement. It is a further object and feature of the present invention to provide such a system that is lightweight, compact, and easy to assemble and disassemble.

A further primary object and feature of the present invention is to provide such a system that is efficient, inexpensive, and handy.

It is a further object and feature of the present invention to provide a method of promoting the sale of such rope practicing systems. It is a further object and feature of the present invention to provide such a method in conjunction with events in which potential purchasers already participate. It is a further object and feature of the present invention to provide such a method that provides multiple incentives for team roping participants to purchase such rope practicing systems. It is a further object and feature of the present invention to provide such a method that requires purchase of such rope practicing systems in order to be eligible for contest prizes.

Other objects and features of this invention will become apparent with reference to the following descriptions.

SUMMARY OF THE INVENTION

In accordance with a preferred embodiment hereof, this invention provides a roping practice system comprising, in combination: leg means for simulating the legs of a bovine animal; pendulum means for providing pendular motion to such leg means; driving means for driving such pendulum means; and support means for supporting such pendulum means.

In accordance with another preferred embodiment hereof, this invention provides a roping practice system comprising, in combination: leg means for simulating the legs of a bovine animal; spring means for providing motion to such leg means; winding means for winding such spring means; and support means for supporting such leg means in a position hanging in the air above the ground.

In accordance with another preferred embodiment hereof, this invention provides a roping practice system comprising, in combination: leg means for simulating the legs of a bovine animal; mechanical potential energy storage means for mechanically storing potential energy; motion means for converting stored energy from such mechanical potential energy storage means into motion of such leg means; and support means for supporting such leg means in a position hanging in the air above the ground.

In accordance with another preferred embodiment hereof, this invention provides a roping practice system comprising, in combination: leg means for simulating the legs of a bovine animal; support means for supporting such leg means in a position hanging in the air above the ground; wherein support means is adapted to connect to a standard trailer hitch A roping practice system comprising, in combination: at least one leg simulating the leg of a bovine animal; wherein such at least one leg is structured and arranged to function as a pendulum; at least one driver to drive pendular motion of such at least one leg; and at least one support to support such at least one leg. Moreover, it provides such a roping practice system wherein such at least one driving mechanism drives in sympathy with the natural frequency of pendular motion of such at least one leg. Additionally, it provides such a roping practice system wherein at least 50% of the mass of such at least one leg is concentrated in the lower 20% of such at least one leg. Also, it provides such a roping practice system further comprising a detachable head portion. In addition, it provides such a roping practice system wherein such detachable head portion is structured and arranged to allow convenient adaptable attachment to a variety of objects. And, it provides such a roping practice system wherein such detachable head portion is structured and arranged to allow attachment to an ice chest cooler. Further, it provides such a roping practice system wherein such at least one driver comprises at least one torsion spring. Even further, it provides such a roping practice system wherein such at least one driver comprises at least one crank for hand winding such at least one torsion spring. Even further, it provides such a roping practice system wherein:

such at least one driving mechanism drives in sympathy with the natural frequency of pendular motion of such at least one leg; at least 50% of the mass of such at least one leg is concentrated in the lower 20% of such at least one leg. Even further, it provides such a roping practice system further comprising a detachable head portion; and such detachable head portion is structured and arranged to allow convenient adaptable attachment to a variety of objects.

In accordance with another preferred embodiment hereof, this invention provides a roping practice system comprising, in combination: at least one leg simulating the leg of a bovine animal; at least one spring to provide motion to such at least one leg; at least one winding mechanism to wind such at least one spring; and at least one support to support such at least one leg in a position hanging in the air above the ground.

In accordance with another preferred embodiment hereof, this invention provides a roping practice system comprising, in combination: at least one leg simulating the leg of a bovine animal; at least one mechanical potential energy storage mechanism to mechanically storing potential energy; at least one motion mechanism to convert stored energy from such at least one mechanical potential energy storage mechanism into motion of such at least one leg; and at least one support to support such at least one leg in a position hanging in the air above the ground. Even further, it provides such a roping practice system wherein such at least one mechanical potential energy storage mechanism comprises at least one torsional spring.

In accordance with another preferred embodiment hereof, this invention provides a roping practice system comprising, in combination: at least one leg simulating the leg of a bovine animal; at least one support to support such at least one leg in a position hanging in the air above the ground; wherein such at least one support is adapted to connect to a standard trailer hitch.

In accordance with another preferred embodiment hereof, this invention provides a roping practice system comprising, in combination: leg means for acting as a ropable leg system of a bovine animal; pendulum means for providing pendular motion to such leg means; driving means for driving such pendulum means; and support means for supporting such pendulum means.

In accordance with another preferred embodiment hereof, this invention provides a roping practice system comprising, in combination: at least one leg system to act as a ropable leg system of a bovine animal; wherein such at least one leg system is structured and arranged to function as a pendulum; at least one driver coupled to such at least on leg system to drive pendular motion of such at least one leg system; and at least one support to support such at least one leg system.

DETAILED DESCRIPTION OF A PREFERRED EMBODIMENT OF THE INVENTION

Figure 1:
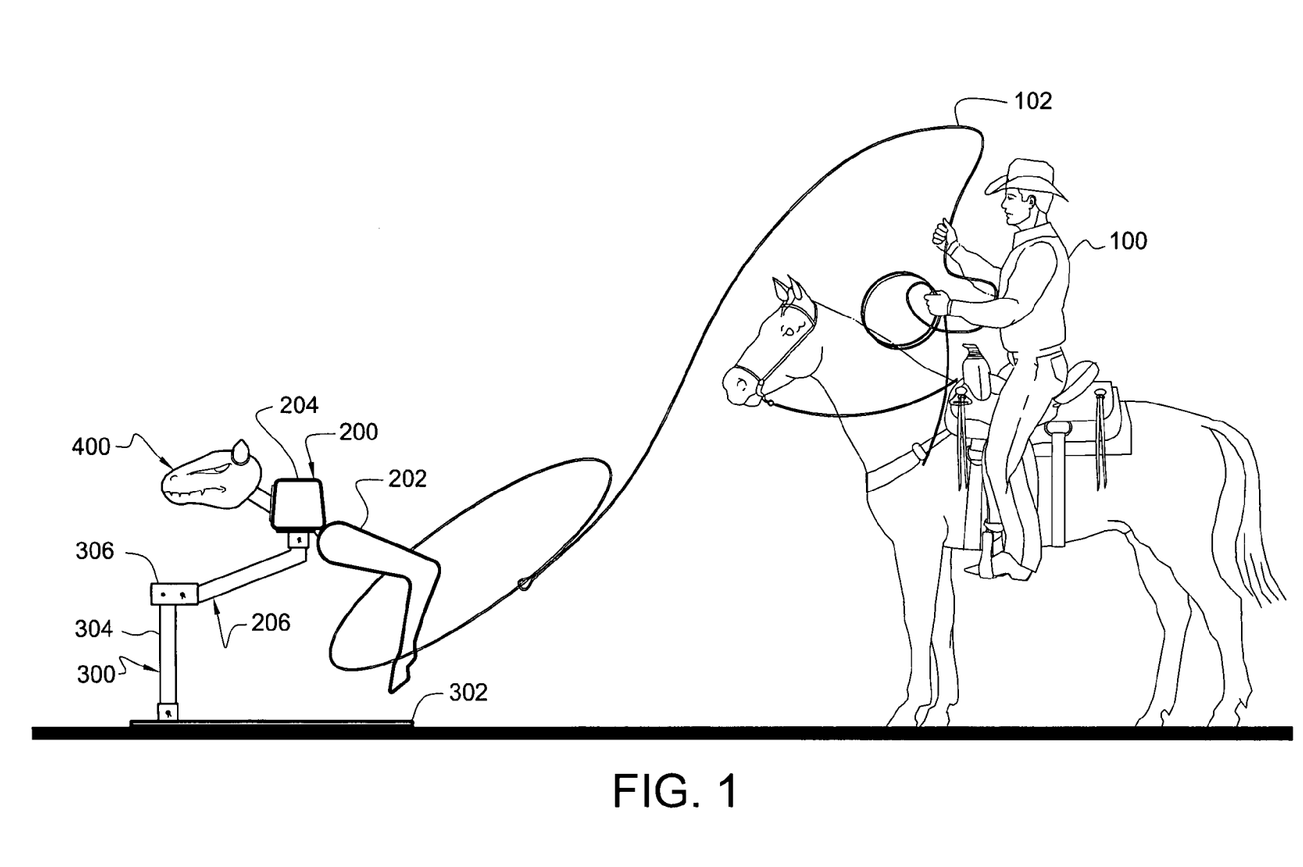
FIG. 1 is a side view of a roping practice system, according to a preferred embodiment of the present invention, showing a user practicing roping.

FIG. 1 is a side view of roping practice system 200, according to a preferred embodiment of the present invention, showing user 100 practicing roping. Preferably, user 100 practices throwing rope 102 around legs 202 of roping practice system 200. Preferably, legs 202 are attached to a driving mechanism 208 (See FIG. 4) which provides motion to legs 202, which simulates the motion of a bovine's legs, so that user 100 is provided with a more realistic and more useful practicing experience. Preferably, driving mechanism 208 is protected by housing 204. Upon reading this specification, those skilled in the art will now understand that, under appropriate circumstances, considering issues such as user preference, production cost, ease of accessing and repairing the driving mechanism, etc., other housing arrangements may suffice, such as, for example, other shapes, other materials, omitting the housing, etc. Preferably, driving mechanism 208 is supported by support 206 (embodying herein support means for supporting such pendulum means), as shown. Preferably, support 206 and driving mechanism 208 are arranged to support legs 202 in a position hanging in the air above the ground, as shown. Preferably, support 206 is inserted and into receiver 306 of stand 300, as shown.

Preferably, receiver 306 is supported about 18" above the ground (a height similar to a standard receiver hitch of a vehicle) by receiver support 304, as shown. Preferably, receiver 306 is structured and arranged with dimensions similar to a receiver of a standard 2" towing hitch. Preferably, receiver support 304 is connected to base 302, as shown. Preferably, Base 302 provides stable support for receiver support 304. Preferably, stand 300 is made of metal, most preferably steel, for strength and durability. Upon reading this specification, those skilled in the art will now understand that, under appropriate circumstances, considering issues such as production cost, market demand, weight, durability, etc., other types of support arrangements may suffice, such as for example, making portions of stand 300 out of aluminum to reduce weight, or wood or plastic, etc., to reduce cost, or different stand geometries, etc.

Figure 2:
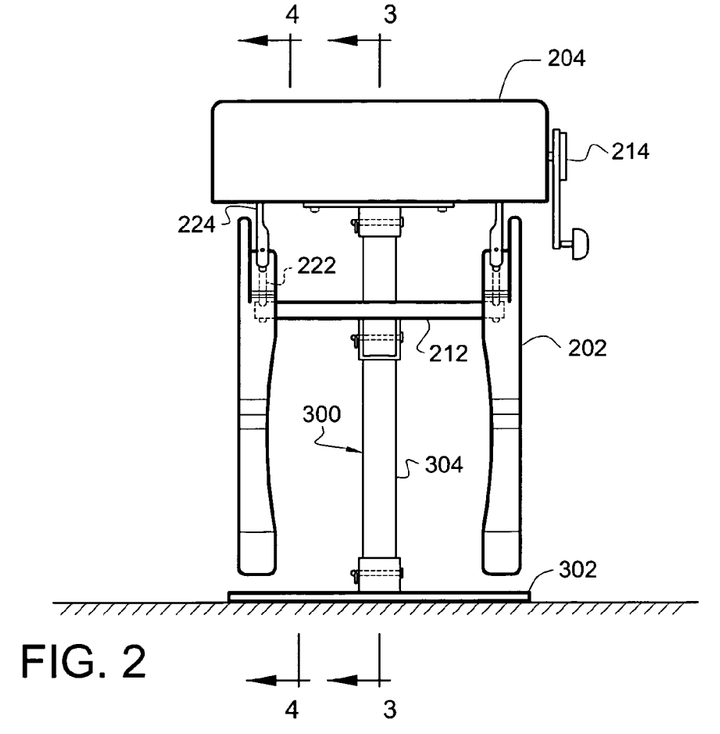
FIG. 2 is a front view of the roping practice system of FIG. 1.

FIG. 2 is a front view of roping practice system 200. Preferably, legs 202 are connected by crossbar 212, which reinforces the rigidity of legs 202. When user 100 successfully ropes legs 202, crossbar 212 helps legs 202 resist bending together from the force exerted by the rope 102.

Preferably, driving mechanism 208 is a spring motor mechanism similar to the mechanism found in U.S. Pat. No. 6,283,870. Preferably, driving mechanism 208 comprises crank 214 for winding spring 207 of driving mechanism 208. Preferably, spring 207 is a torsional spring, which mechanically stores potential energy by increasing (or decreasing) the number of coils in spring 207. Preferably, user 100 turns crank 214 (embodying herein at least one winding mechanism to wind such at least one spring), thereby winding spring 207 within driving mechanism 208, thereby mechanically storing potential energy in driving mechanism 208. Upon reading this specification, those skilled in the art will now understand that, under appropriate circumstances, considering issues such as production cost, market demand, intended use, proximity to electricity, etc., other driving mechanisms, such as for example, electric motors (which may for example, adversely affect portability, but favorably affect the amount of power supplied by the driving mechanism), etc., may suffice.

Figure 3:
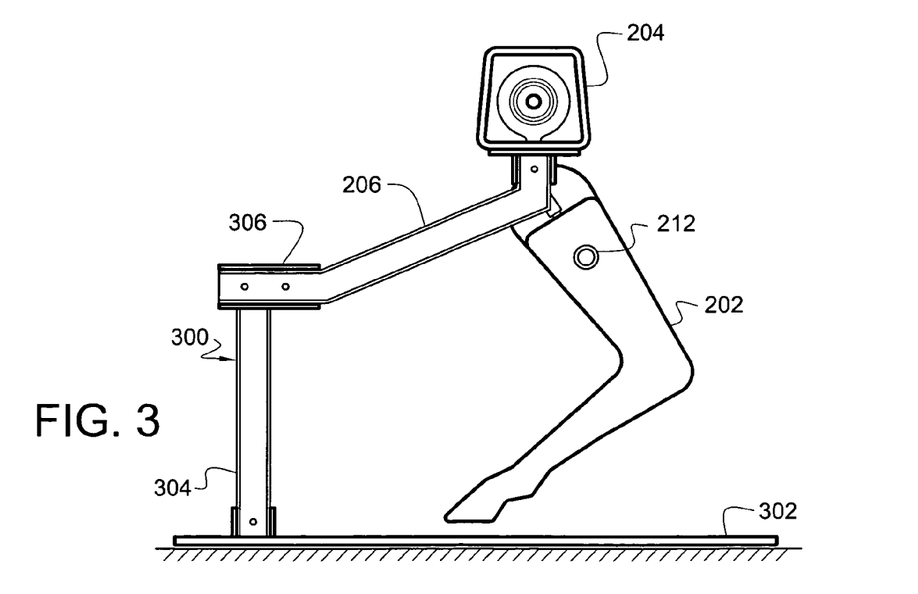
FIG. 3 is a sectional view through the section 3—3 of the roping practice system of FIG. 2.
Figure 4:
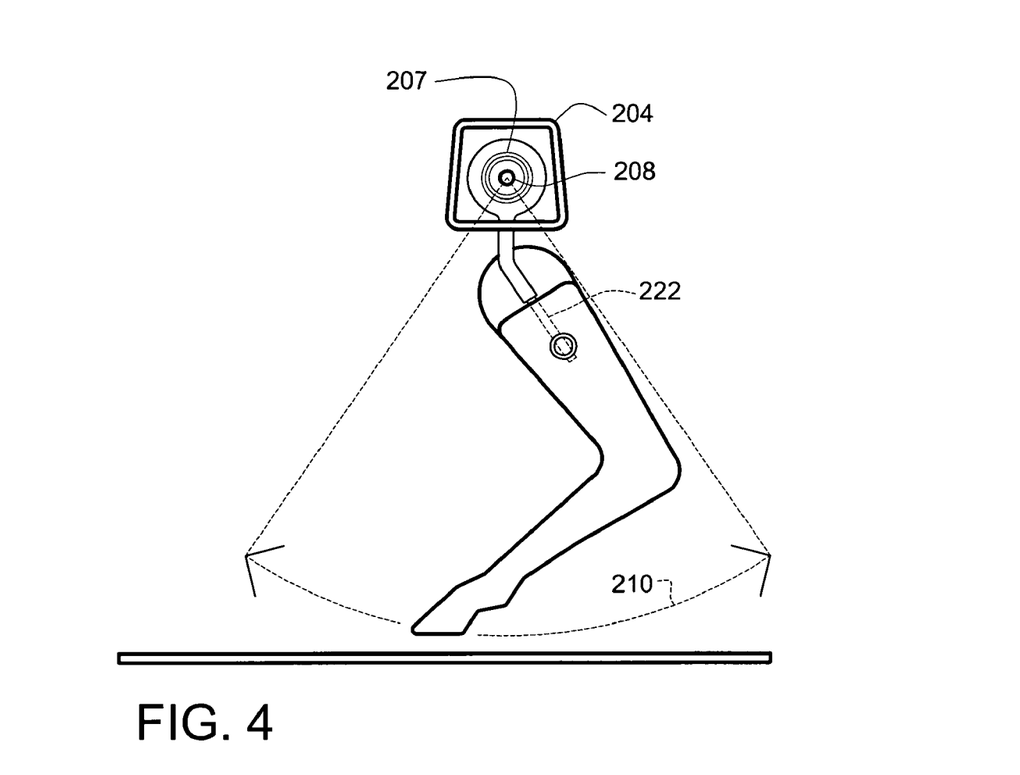
FIG. 4 is a sectional view through the section 4—4 of the roping practice system of FIG. 2.

FIG. 3 is a sectional view through the section 3—3 of roping practice system 200. FIG. 4 is a section view through 4—4 of roping practice system 200. Preferably, legs 202 (embodying herein leg means for acting as a ropable leg system of a bovine animal; and embodying herein at least one leg system to act as a ropable leg system of a bovine animal) are weighted sufficiently in coordination with driving mechanism 208, so that legs 202 swing back and forth with pendular motion 210 (such arrangement embodying herein wherein such at least one leg system is structured and arranged to function as a pendulum). Preferably, driving mechanism 208 drives the pendular motion 210 of legs 202 by converting mechanical potential energy stored in spring 207 into driving force. Preferably, driving mechanism 208 (embodying herein driving means for driving such pendulum means; and embodying herein at least one driver coupled to such at least on leg system to drive pendular motion of such at least one leg system) drives in sympathy with the natural frequency of pendular motion 210 of legs 202 to most efficiently maintain amplitude of pendular motion 210 by overcoming energy losses from friction, etc.

Figure 5:
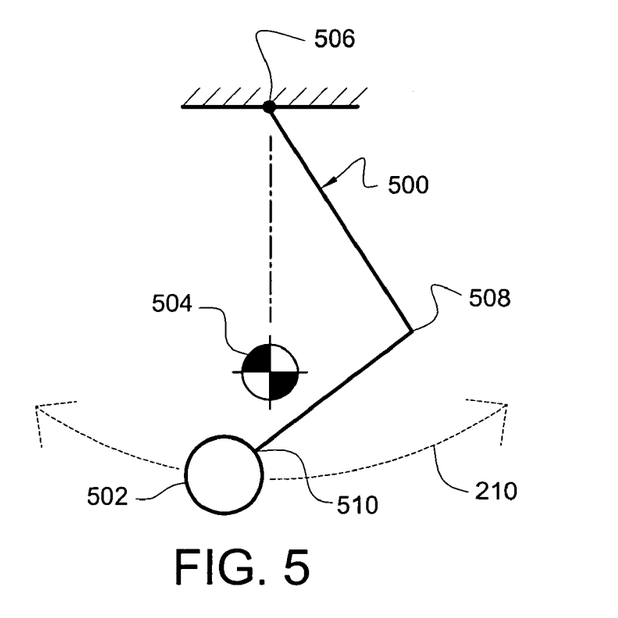
FIG. 5 is a simplified symbolic representation of the legs of the roping practice system acting as a pendulum.

FIG. 5 is a simplified symbolic representation of legs 202 as a pendulum 500. The center of mass 504 of pendulum 500 is determined by the distribution of mass throughout the pendulum 500. The range of motion of legs 202 (pendulum 500) is partially determined by the location of the center of mass 504 in relation to the geometry of pendulum 500. For example, the range of motion of the legs 202 can be shifted by changing the location of a concentrated mass 502 from hoof 510 (as shown) to knee 508. Periodicity of pendulum 500 depends on how far the center of mass 504 is from pivot point 506. The farther the center of mass 504 from pivot point 506, the longer the period will be. By having a concentrated mass 502 far from pivot point 506, the period of motion can be lengthened, while minimizing overall mass of pendulum 500 (thereby allowing roping practice system 200 to be less cumbersome and more portable). Preferably, legs 202 have a concentrated mass 502 near the hoof 510, as shown. Preferably, at least 50% of the mass of legs 202 is concentrated in the hoof 510 (defined herein as the lower 20% of legs 202) furthest from pivot point 506. Upon reading this specification, those skilled in the art will now understand that, under appropriate circumstances, considering issues such as desired periodicity for legs, user preference, etc., other distributions of mass, such as, for example, having a concentrated mass near knee 508 to produce a quicker period of motion, etc., may suffice.

By suspending legs 202 in the air above the ground and weighting legs 202 properly to achieve pendular motion 210, motion of the legs 202 is assisted by gravity, and therefore, the amount of energy required to maintain motion of legs 202 is significantly less than prior art systems. The energy required to maintain motion of the legs 202 is low enough that a hand cranked driving mechanism 208 is sufficient to drive pendular motion 210 of the legs 202 for a significant amount of time. Such a hand-cranked driving mechanism is compact, lightweight, and less cumbersome than prior art roping practice systems with drive mechanisms.

Figure 6:
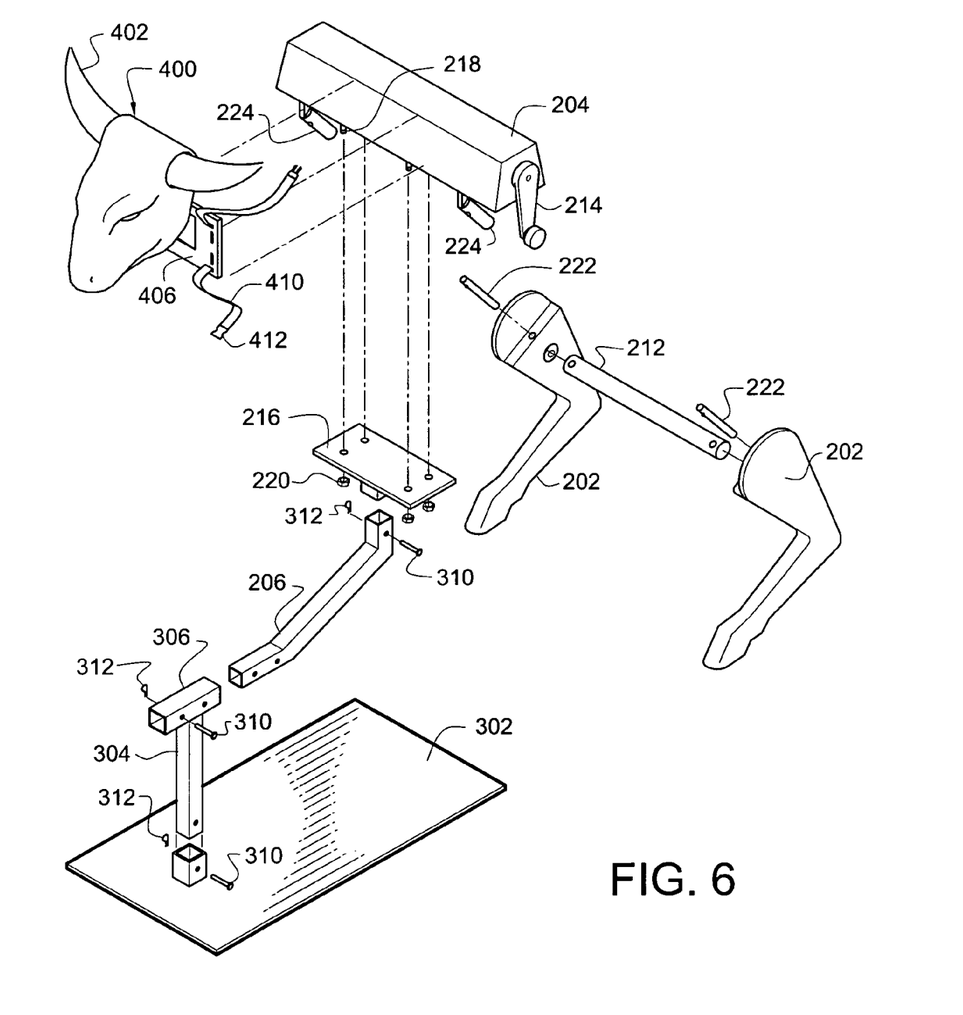
FIG. 6 is an exploded perspective view of the roping practice system of FIG. 1.

Preferably, receiver support 304 is connected to base 302 with a quick-release fastening mechanism, preferably, a clevis pin 310 and retainer clip 312, as shown. Upon reading this specification, those skilled in the art will now understand that, under appropriate circumstances, considering issues such as production cost, market demand, user preference, etc., other types of fastening mechanisms, such as for example, nuts and bolts, etc., may suffice. Preferably base 302 comprises a sheet of metal. Preferably, receiver 306 is welded to receiver support 304. Preferably, support 206 slides into receiver 306 and is held in place by clevis pin 310 and retainer clip 312, as shown. Preferably, support 206 is angled, as shown, to minimize interference with roping of legs 202 and head 400. Preferably, support 206 is connected to mounting plate 216 with clevis pin 310 and retainer clip 312, as shown. Preferably, mounting plate 216 is securely connected to housing 204 with housing fastening system, preferably nuts 220 and bolts 218, as shown. Upon reading this specification, those skilled in the art will now understand that, under appropriate circumstances, considering issues such as production cost, market demand, user preference, etc., other types of housing fastening systems, such as for example, screws, welding, etc., may suffice. Preferably, driving mechanism 208 comprises sockets 224. Preferably, attachers 222 fit into sockets 224 and are held in place by fastener 226. Preferably, attachers 222 attach to legs, as shown. Preferably, roping practice system 200 can be quickly and easily assembled/disassembled by fastening/unfastening, respectively, legs 202 from sockets 224, mounting plate 216 from support 206, and support 206 from stand 300 (or towing hitch receiver 352), and detachable head portion 400 from housing 204.

Figure 7:
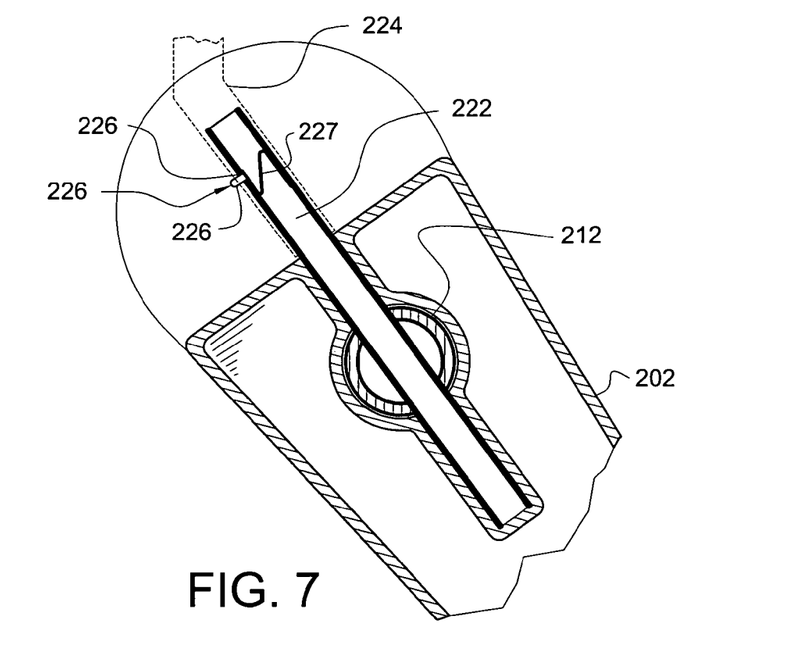
FIG. 7 is a magnified cutaway view of a top portion of a leg of the roping practice system of FIG. 1.

FIG. 7 is a magnified cutaway view of a top portion of one of the legs 202 of roping practice 200 system. Preferably, fastener 226 comprises tab 228 which is biased to enter into hole 230 in socket 224 by spring-loaded portion 227. Preferably, fastener 226 allows attacher to be quickly and easily detached from socket 224. Preferably, attacher 222 passes through crossbar 212, as shown. Upon reading this specification, those skilled in the art will now understand that, under appropriate circumstances, considering issues such as production cost, material selection, etc., other attacher configurations, such as for example, nuts and bolts, etc., may suffice.

Figure 8:
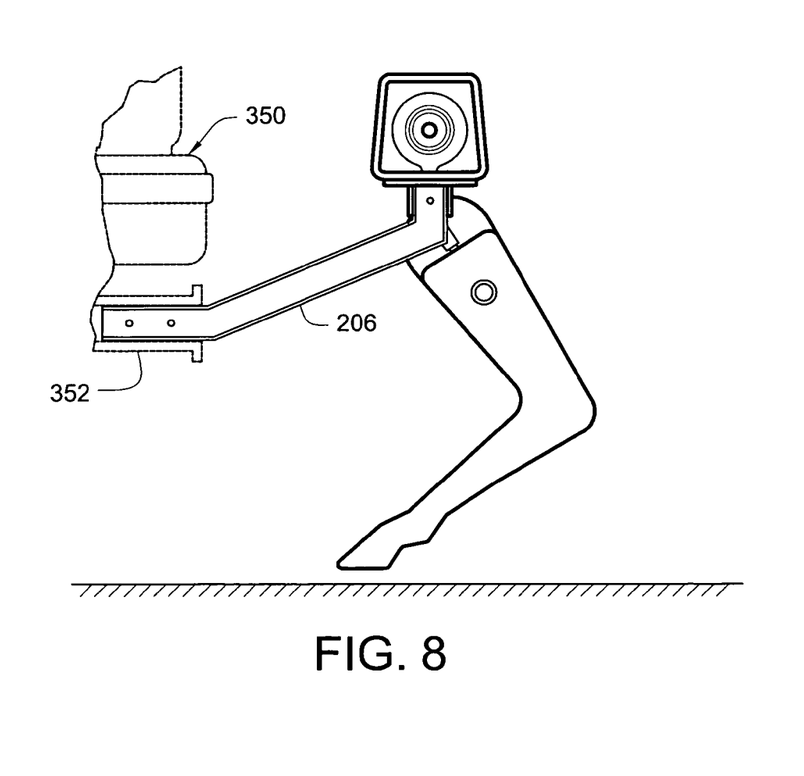
FIG. 8 is a side view, partially cutaway, of a roping practice system, according to a preferred embodiment of the present invention, attached to the trailer hitch of a vehicle.

FIG. 8 is a side view, partially cutaway, of roping practice system 200, according to a preferred embodiment of the present invention, attached to towing hitch receiver 352 of vehicle 350. Preferably, support 206 is structured and arranged so that the lowest point of the swinging legs 202 has about an inch of clearance above the ground whether support 206 is inserted and attached into a standard towing hitch receiver 352 (as shown in FIG. 8), or attached to receiver support 306 (as shown in FIG. 3). Preferably, height of housing 204 (and therefore legs 202) can be adjusted by inserting adjustable height extenders (not shown) into the top of support 206.

Figure 9:
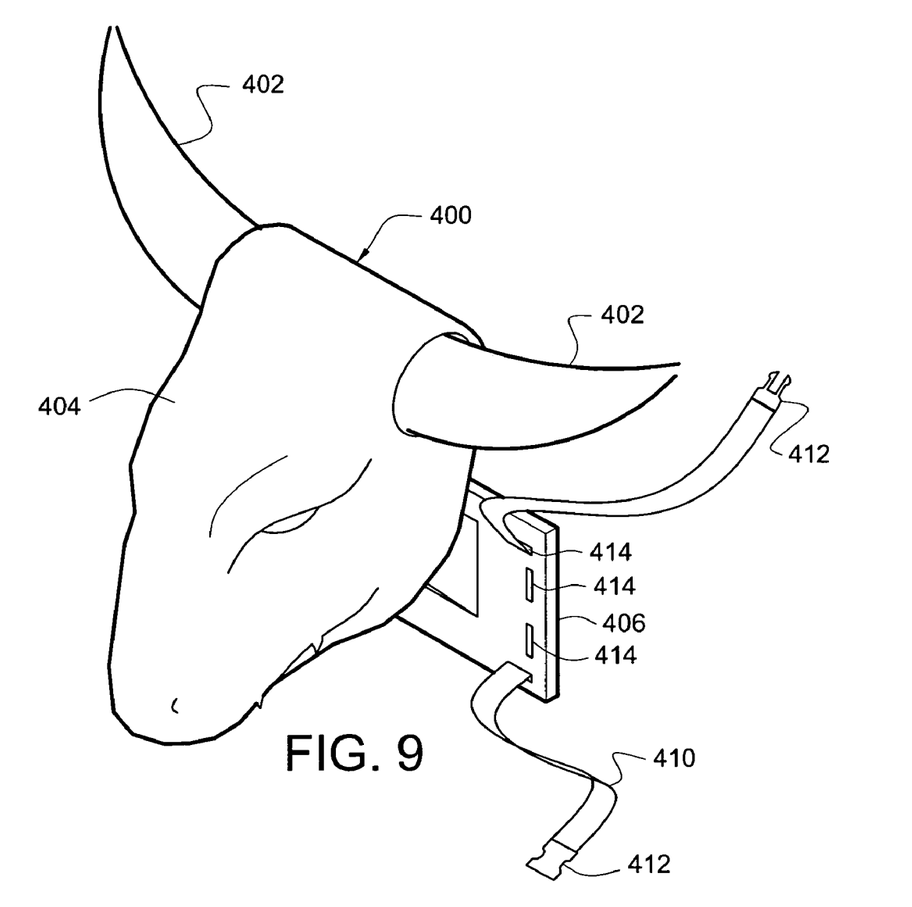
FIG. 9 is a perspective view of a head portion of a roping practice system, according to a preferred embodiment of the present invention.

FIG. 9 is a perspective view of a head portion of roping practice system 200, according to a preferred embodiment of the present invention. Preferably, detachable head portion 400 comprises head 404 and two horns 402, as shown. Preferably, detachable head portion 400 is connected to head mounting plate 406 by head support 408, as shown. Preferably, head mounting plate 406 has openings 414 through which straps 410 can be threaded, as shown. Preferably, head mounting plate 406 and straps 410 are structured and arranged to allow detachable head portion 400 to be securely attached to housing 204 (as shown in FIG. 1). Preferably, head mounting plate 406 has a variety of openings 414 to allow a variety of different strap arrangements so that detachable head portion 400 can be securely attached to a variety of different objects, such as ice chest coolers, fences, etc. Preferably, straps 410 comprise clasps 412, as shown, to allow user 100 to conveniently fasten straps 410.

Figure 10:
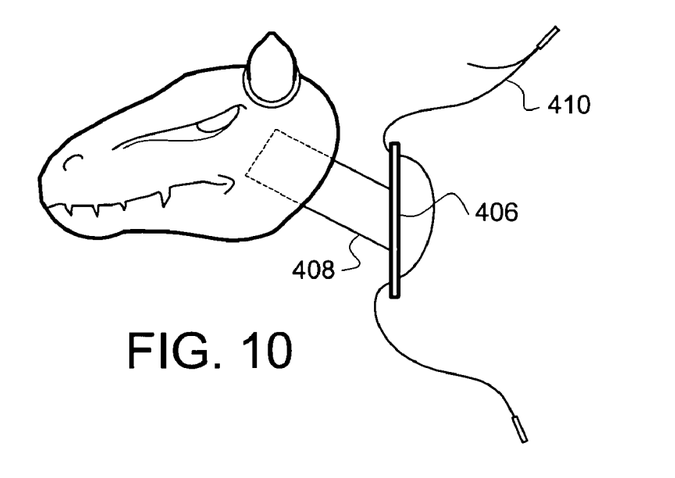
FIG. 10 is a side view of the head portion of FIG. 9, according to a preferred embodiment of the present invention.

FIG. 10 is a side view of the head portion of FIG. 9, according to a preferred embodiment of the present invention.

Figure 11:
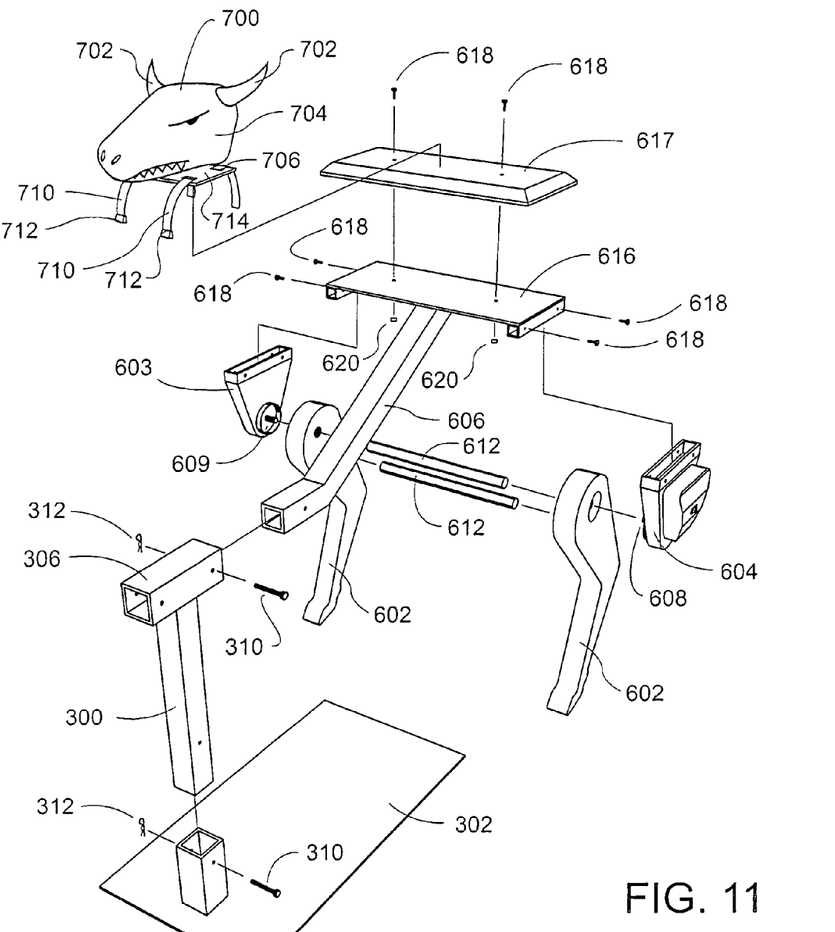
FIG. 11 is an exploded perspective view of an alternate preferred embodiment.

FIG. 11 is an exploded perspective view of an alternate preferred embodiment. Preferably driving mechanism 608 is protected by housing 604. Preferably, user 100 practices throwing rope 102 around legs 602. Preferably, legs 602 are attached to driving mechanism 608 which provides motion to legs 602, which simulates the motion of a bovine's legs, so that user 100 is provided with a more realistic and more useful practicing experience. Preferably, driving mechanism 608 is protected by housing 604. Upon reading this specification, those skilled in the art will now understand that, under appropriate circumstances, considering issues such as user preference, production cost, ease of accessing and repairing the driving mechanism, etc., other housing arrangements may suffice, such as, for example, other shapes, other materials, omitting the housing, etc. Preferably, driving mechanism 608 is attached to mounting plate 616 which is attached to support 606, as shown (embodying herein support means for supporting such pendulum means), as shown. Preferably, support 606 and driving mechanism 608 are arranged to support legs 602 in a position hanging in the air above the ground, as shown. Preferably, support 606 is inserted and into receiver 306 of stand 300, as shown. Preferably, receiver 306 is supported about 18" above the ground (a height similar to a standard receiver hitch of a vehicle) by receiver support 304, as shown. Preferably, receiver 306 is structured and arranged with dimensions similar to a receiver of a standard 2" towing hitch. Preferably, receiver support 304 is connected to base 302, as shown. Base 302 provides stable support for receiver support 304. Preferably, stand 300 is made of metal, preferably steel, for strength and durability. Upon reading this specification, those skilled in the art will now understand that, under appropriate circumstances, considering issues such as production cost, market demand, weight, durability, etc., other types of support arrangements may suffice, such as for example, making portions of stand 300 out of aluminum to reduce weight, or wood to reduce cost, or different stand geometries, etc.

Preferably, legs 602 are connected by at least one crossbar 612, preferably two crossbars 612, which reinforce the rigidity of legs 602. When user 100 successfully ropes legs 602, crossbars 612 helps legs 602 resist bending together from the force exerted by the rope 102.

Preferably, driving mechanism 608 is a battery powered motor mechanism, preferably from GRACO serial number 0103030955, model number 1481ZOU. Preferably, driving mechanism 608 is powered by "D-cell" batteries. Preferably batteries (not shown) are housed inside housing 604. Upon reading this specification, those skilled in the art will now understand that, under appropriate circumstances, considering issues such as production cost, market demand, intended use, proximity to electricity, etc., other driving mechanisms arrangements may suffice, such as, for example, other types of electric motors, motors which receive power through a cord plugged into an outlet, etc.

Preferably, legs 602 (embodying herein leg means for acting as a ropable leg system of a bovine animal; and embodying herein at least one leg system to act as a ropable leg system of a bovine animal) are weighted sufficiently in coordination with driving mechanism 608, so that legs 602 swing back and forth with pendular motion 610 (such arrangement embodying herein wherein such at least one leg system is structured and arranged to function as a pendulum). Preferably, driving mechanism 608 drives legs 602 back and forth, preferably in a pendular motion. Preferably, driving mechanism 608 (embodying herein driving means for driving such pendulum means; and embodying herein at least one driver coupled to such at least on leg system to drive pendular motion of such at least one leg system) drives in sympathy with the natural frequency of pendular motion 610 of legs 602 to most efficiently maintain amplitude of pendular motion 610 by overcoming energy losses from friction, etc.

By suspending legs 602 in the air above the ground and weighting legs 602 properly to achieve pendular motion 210, motion of the legs 602 is assisted by gravity, and therefore, the amount of energy required to maintain motion of legs 602 is significantly less than prior art systems. The energy required to maintain motion of the legs 602 is low enough that a battery powered driving mechanism 608 is sufficient to drive pendular motion 210 of the legs 602 for a significant amount of time. Such a battery powered driving mechanism is compact, lightweight, and less cumbersome than prior art roping practice systems with drive mechanisms. Upon reading this specification, those skilled in the art will now understand that, under appropriate circumstances, considering issues such as production cost, power and efficiency of driving mechanism, strength and weight of materials used to make the legs, intended use, etc., other driving arrangements may suffice, such as, for example, making light-weight legs and driving legs with non-pendular motion, etc.

Preferably, mounting plate 616 is welded to support 606, as shown. Preferably, mounting plate 616 comprises top cover 617, as shown. Preferably, top cover 617 is made of plastic. Upon reading this specification, those skilled in the art will now understand that, under appropriate circumstances, considering issues such as production cost, market demand, user preference, etc., other types of mounting arrangements may suffice, such as, for example, using different materials, omitting top cover 617, etc. Preferably, housing 604 is securely connected to mounting plate 616 with housing fastening system, preferably nuts 620 and bolts 618, as shown. Upon reading this specification, those skilled in the art will now understand that, under appropriate circumstances, considering issues such as production cost, market demand, user preference, etc., other types of housing fastening systems may suffice, such as, for example, using screws, welding, etc.

Preferably, one leg 602 is attached to driving mechanism 608 and the other leg 602 is attached to pivot 609, as shown. Preferably pivot 609 allows legs 602 to freely pivot. Preferably pivot 609 is housed in pivot housing 603, which is attached to mounting plate 616, as shown. Upon reading this specification, those skilled in the art will now understand that, under appropriate circumstances, considering issues such as type of driving mechanism, mounting plate configuration, etc., other leg mounting arrangements may suffice, such as, for example, connecting each leg 602 to a separate driving mechanism 608 (instead of one leg to a driving mechanism 608 and the other leg to a free pivot 609), connecting driving mechanism 608 and/or pivot 609 to the top of leg 602, instead of the side, etc. Preferably, roping practice system 200 can be quickly and easily assembled and disassembled by fastening/unfastening respectively detachable head portion 700 from mounting plate 616, crossbars 616 from legs 602, legs 202 from driving mechanism 608 and/or pivot 609, driving mechanism 608 from mounting plate 616, pivot 609 from mounting plate 616, support 206 from stand 300 (or towing hitch receiver 352), as shown.

Preferably, detachable head portion 700 comprises head 704 and two horns 702, as shown. Preferably, detachable head portion 700 is connected to head mounting plate 706, as shown. Preferably, head mounting plate 706 has openings 714 through which straps 710 can be threaded, as shown. Preferably, head mounting plate 706 and straps 710 are structured and arranged to allow detachable head portion 700 to be securely attached to mounting plate 616, as shown. Preferably, head mounting plate 706 has a variety of openings 714 to allow a variety of different strap arrangements so that detachable head portion 700 can be securely attached to a variety of different objects, such as ice chest coolers, fences, etc. Preferably, straps 710 comprise clasps 712, as shown, to allow user 100 to conveniently fasten straps 710.

Figure 12:
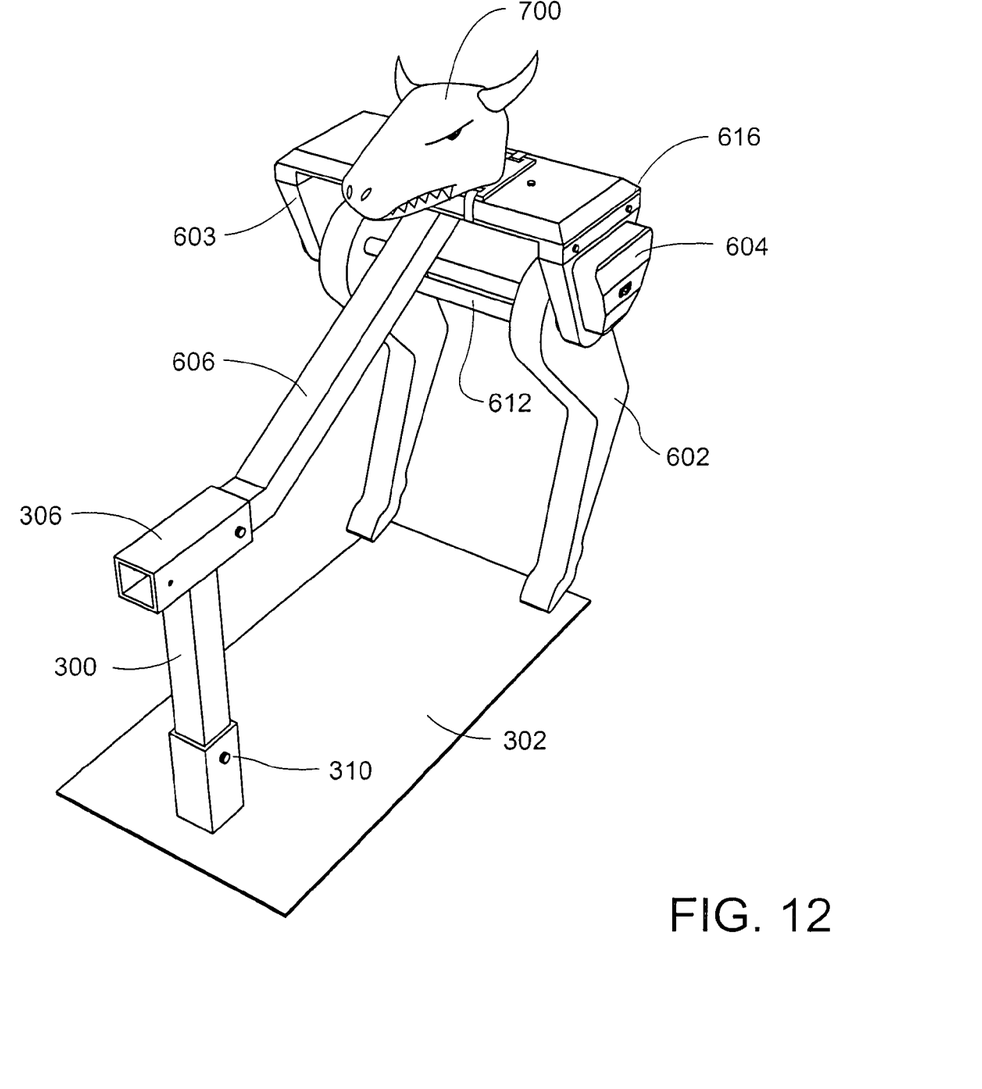
FIG. 12 is a perspective view of the embodiment of FIG. 11 (assembled).

FIG. 12 is a perspective view of the embodiment of FIG. 11 (assembled).

Figure 13:
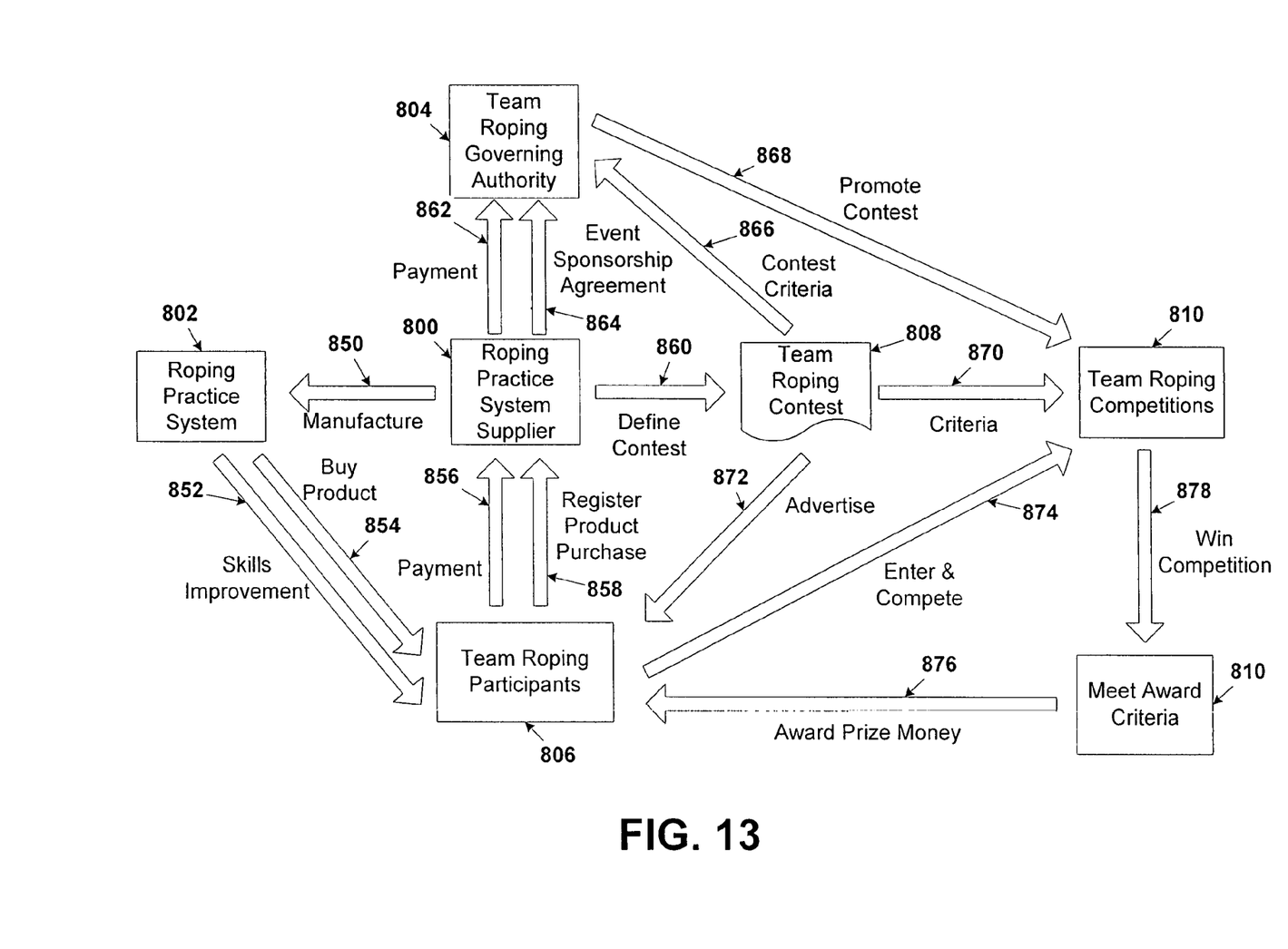
FIG. 13 is a simplified relational diagram of a of preferred method of marketing a rope practicing system according to a preferred embodiment of the present invention.

FIG. 13 is a simplified relational diagram of a of preferred method of marketing a rope practicing system according to a preferred embodiment of the present invention. Preferably, rope practice system supplier 800 manufactures roping practice systems 802 as indicated by flow 850. Upon reading the teachings of this specification, those with ordinary skill in the art will now understand that, under appropriate circumstances, considering issues such as market demand, supplier preference, etc., other arrangements may suffice, such as, for example, supplier purchasing rope practice systems from a wholesaler, supplier supplying systems other than roping practice systems, etc. Preferably, rope practice system supplier 800 creates and defines the parameters of roping contest 808, as indicated by flow 860. Upon reading the teachings of this specification, those with ordinary skill in the art will now understand that, under appropriate circumstances, considering issues such as governing authority preference, supplier preference, etc., other arrangements may suffice, such as, for example, adopting parameters of contests created by others, etc.

Preferably, roping contest 808 is designed to give incentives to team roping participants 806 to purchase roping practice system 802. Preferably, roping contest 808 is designed so that team roping participants 806 are motivated by more than one factor to buy roping practice system 802. Preferably, at least one factor motivating team roping participants 806 is a reward, preferably a cash prize, such as, for example, prizes awarded based on roping skills which can be improved by using roping practice system 802. Preferably another factor motivating team roping participants 806 to buy roping practice system 802 is a requirement to purchase roping practice system 802 in order to qualify to win prizes in roping contest 808. Upon reading the teachings of this specification, those with ordinary skill in the art will now understand that, under appropriate circumstances, considering issues such as laws, approval of team roping (or other sport) governing authority 804, preference of rope practice system supplier 800, etc., other motivating arrangements may suffice, such as, for example, not requiring purchase of practice system, awarding non-cash prizes, etc.

Preferably, roping practice system supplier 800 arranges with at least one team roping governing authority 804, preferably the United States Team Roping Championships, Inc. (USTRC), for permission to promote roping contest 808 in conjunction with team roping competitions 810 sponsored by team roping governing authority 804, as indicated by flow 864. Upon reading the teachings of this specification, those with ordinary skill in the art will now understand that, under appropriate circumstances, considering issues such as preference of rope practice system supplier 800, etc., other competition arrangements may suffice, such as, for example, rope practice system supplier 800 sponsoring contest events without approval of the team roping governing authority 804, etc. Preferably, roping practice system supplier 800 pays team roping governing authority 804, as indicated by flow 862, for the right to advertise and promote roping contest 808 in conjunction with team roping competitions 810 sponsored by roping governing authority 804. Upon reading the teachings of this specification, those with ordinary skill in the art will now understand that, under appropriate circumstances, considering issues such as preference of rope practice system supplier 800, preference of roping governing authority 804, etc., other advertising and promotion arrangements may suffice, such as, for example, roping practice system supplier 800 not paying team roping governing authority 804 (since, for example, the contest will be a benefit to the team roping governing authority anyway by promoting the sport and encouraging more participation at the events), etc.

Preferably, team roping governing authority 804 approves of contest criteria as indicated by flow 866. Preferably, team roping governing authority 804 assists in the promotion of roping contest 808 for team roping competitions 810, as indicated by flow 868. Preferably, roping practice system supplier 800 advertises roping contest 808, preferably targeting team roping participants 806, as indicated by flow 872. Preferably, team roping participants 806 pay roping practice system supplier 800, as indicated by flow 856, in order to buy roping practice system 802, as indicated by flow 854. Upon reading the teachings of this specification, those with ordinary skill in the art will now understand that, under appropriate circumstances, considering issues such as preference of rope practice system supplier 800, market demand, etc., other purchasing arrangements may suffice, such as, for example, team roping participants 806 purchasing roping practice system 802 from a third-party intermediary distributor, etc.

Preferably, team roping participants 806 improve their roping skills (thereby improving their chances of winning roping contest 808) by using roping practice system 802, as indicated by flow 852. Preferably, team roping participants 806 register purchase of roping practice system 802 with roping practice system supplier 800, as indicated by flow 858. Preferably, registering product purchase is a requirement for team roping participants 806 to be eligible to win prizes in roping contest 808. Preferably, both team roping participants 806 of a team must each buy roping practice system 802 and be registered in order for either to be eligible to win prizes in roping contest 808. Upon reading the teachings of this specification, those with ordinary skill in the art will now understand that, under appropriate circumstances, considering issues such as laws, preference of rope practice system supplier 800, team roping participant preference, etc., other registration arrangements may suffice, such as, for example, registering with an independent third-party contest authority, requiring only one participant of a team to register, etc.

Preferably, team roping participants 806 are eligible to win prizes in roping contest 808 for a limited period of time after purchasing and registering the purchase of roping practice system 802, preferably a period of time beginning 30 days after purchase and ending one year from purchase. Upon reading the teachings of this specification, those with ordinary skill in the art will now understand that, under appropriate circumstances, considering issues such as laws, preference of rope practice system supplier 800, etc., other periods of eligibility arrangements may suffice, such as, for example, being eligible for roping contest 808 only during a specific competition season (part season, whole season, or multiple seasons), being eligible for roping contest 808 only for specific events (such as, for example, a limited number of events), etc.

Preferably, team roping participants 806 participate in team roping competitions 810 sponsored by team roping governing authority 804, as indicated by flow 874, in order to be eligible to win prizes in roping contest 808. Preferably, criteria for winning prizes in roping contest 808 can be determined from team roping competitions 810, as indicated by flow 870. For example, some or all of the criteria for winning roping contest 808 may be factors measured by team roping governing authority 804 during team roping competitions 810 (such as, for example, fastest time in a round, fastest average time, etc.). Upon reading the teachings of this specification, those with ordinary skill in the art will now understand that, under appropriate circumstances, considering issues such as preference of rope practice system supplier 800, preference of team roping governing authority 804, etc., other criteria arrangements may suffice, such as, for example, establishing criteria other than those measured by team roping governing authority 804, or other than required to win a competition, such as two times of 7 seconds of better, etc. Preferably, team roping participants 806 that win team roping competitions 810 are assessed to see if they meet contest award criteria 812, as indicated by flow 878. Preferably, team roping participants 806 that win team roping competitions 810 and meet contest award criteria 812 are awarded prize money, as indicated by flow 876.

Figure 14:
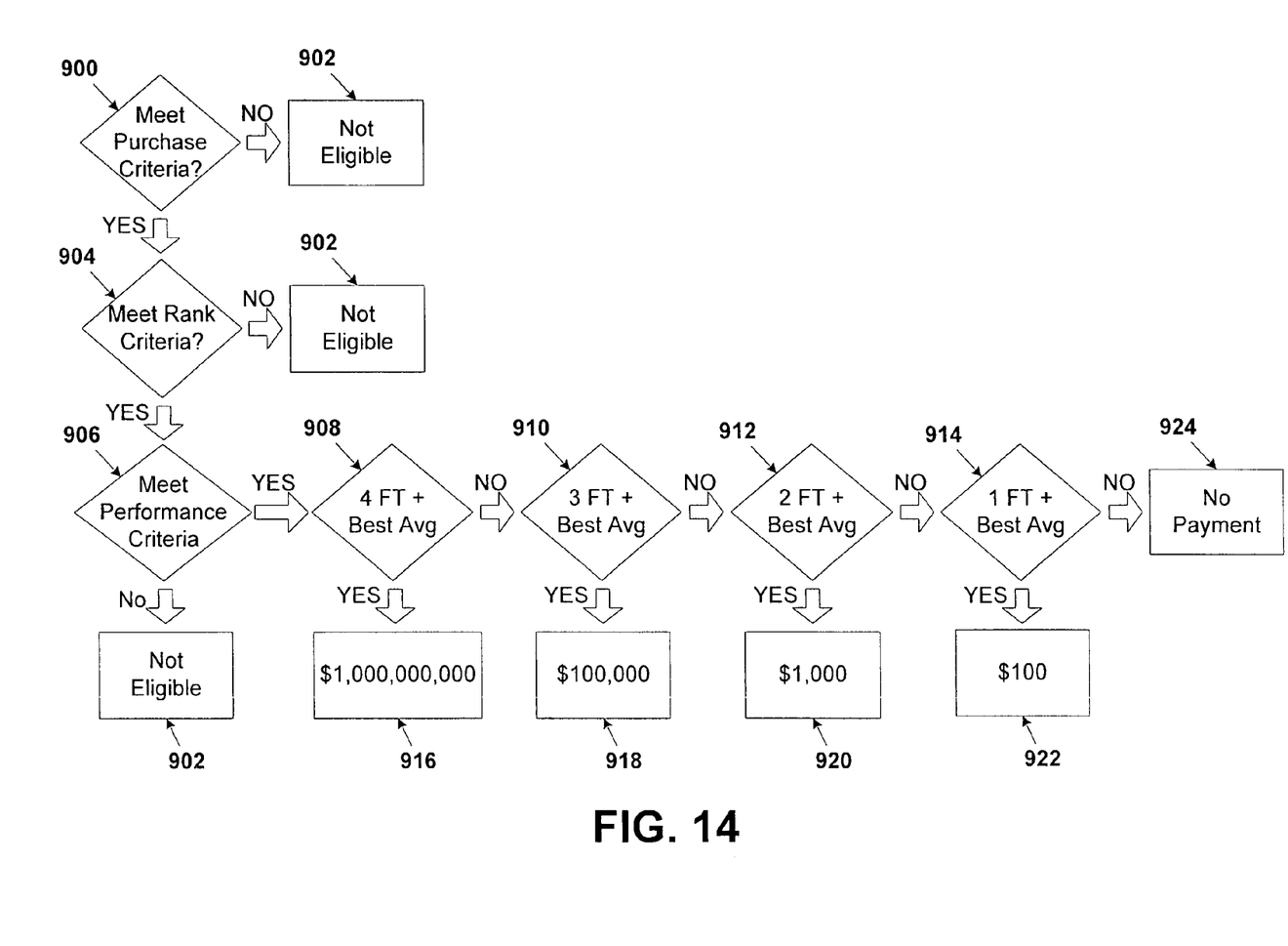
FIG. 14 is a simplified flow diagram of a of preferred method of marketing a rope practicing system according to a preferred embodiment of the present invention.

FIG. 14 is a simplified flow diagram of a of preferred method of marketing a rope practicing system according to a preferred embodiment of the present invention. Preferably, team roping participants 806 (see FIG. 13) must meet the purchase criteria 900 defined by roping practice system supplier 800 or they are not eligible 902 for prize money. For example, preferably each of the team roping participants 806 on a roping team must have purchased a roping practice system 802 at least 30 days, but not longer than one year, prior to the team roping competition 810. Preferably, those teams which meet the purchase requirements must also meet the other requirements established by roping practice system supplier 800 or they are not eligible 902 for prize money. For example, preferably, the rank established by the team roping governing authority 804 (for example, the USTRC) for each of the team roping participants 806 on a roping team must fall within the qualifying rank criteria 904 established by roping practice system supplier 800 in order to be eligible for prize money. For example, preferably, each of the team roping participants 806 on a roping team must be ranked a number four (#4) or less by the team roping governing authority 804 in order to be eligible for prize money (a ranking of "4" is the maximum level of skill allowable to be eligible).

Preferably, team roping participants 806 must meet performance criteria 906 established by roping practice system supplier 800 or they are not eligible 902 for prize money. For example, preferably, team roping participants 806 must win a team roping competition 810 sanctioned by the team roping governing authority 804 in order to be eligible for prize money. Preferably, the amount of prize money awarded to team roping participants 806 depends on the performance of the team roping participants 806 in a team roping competition 810 sanctioned by the team roping governing authority 804. For example, preferably, team roping participants 806 that have the fastest average time and also have four fastest times 908 in a team roping competition 810 share a one million dollar prize 916. Preferably, team roping participants 806 that have the fastest average time and also have three fastest times 910 in a team roping competition 810 share a one hundred thousand dollar prize 918.

Preferably, team roping participants 806 that have the fastest average time and also have two fastest times in a team roping competition 810 each win a thousand dollar prize 920. Preferably, team roping participants 806 that have the fastest average time and also have one fastest time in a team roping competition 810 each win a hundred dollar prize 922. Preferably, team roping participants 806 that have won a prize are ineligible for future team roping competitions 810 from winning the same prize level. For example, preferably, a team that has won the million dollar prize would not be eligible to win the million dollar prize again, but would be eligible to win the hundred thousand dollar prize. Upon reading the teachings of this specification, those with ordinary skill in the art will now understand that, under appropriate circumstances, considering issues such as preference of rope practice system supplier 800, preference of team roping governing authority 804, etc., other prize arrangements may suffice, such as, for example, alternate amounts of money, non-cash prizes, etc.

Although applicant has described applicant's preferred embodiments of this invention, it will be understood that the broadest scope of this invention includes such modifications as diverse shapes and sizes and materials. Such scope is limited only by the below claims as read in connection with the above specification.

Further, many other advantages of applicant's invention will be apparent to those skilled in the art from the above descriptions and the below claims.

What is claimed is:

1. A roping practice system comprising, in combination:
   a) leg means for simulating the legs of a bovine animal;
   b) pendulum means for providing pendular motion to swing said leg means freely under the action of gravity;
   c) driving means for driving said pendulum means; and
   d) support means for supporting said pendulum means.

2. A roping practice system comprising, in combination:
   a) at least one leg simulating the leg of a bovine animal;
   b) wherein said at least one leg is structured and arranged to swing freely under the action of gravity and function as a pendulum;

c) at least one driver to drive pendular motion of said at least one leg; and d) at least one support to support said at least one leg.

3. The roping practice system according to claim 2 wherein said at least one driving mechanism drives in sympathy with the natural frequency of pendular motion of said at least one leg.

4. The roping practice system according to claim 2 wherein at least 50% of the mass of said at least one leg is concentrated in the lower 20% of said at least one leg.

5. The roping practice system according to claim 2 further comprising a detachable head portion.

6. The roping practice system according to claim 5 wherein said detachable head portion is structured and arranged to allow convenient adaptable attachment to a variety of objects.

7. The roping practice system according to claim 2 wherein said at least one driver comprises at least one torsion spring.

8. The roping practice system according to claim 7 wherein said at least one driver comprises at least one crank for hand winding said at least one torsion spring.

9. The roping practice system according to claim 8 wherein:

a) said at least one driving mechanism drives in sympathy with the natural frequency of pendular motion of said at least one leg;

b) at least 50% of the mass of said at least one leg is concentrated in the lower 20% of said at least one leg.

10. The roping practice system according to claim 9 further comprising a) a detachable head portion; and b) said detachable head portion is structured and arranged to allow convenient adaptable attachment to a variety of objects.

11. A roping practice system comprising, in combination:

a) at least one leg system to act as a ropable leg system of a bovine animal;

b) wherein said at least one leg system is structured and arranged to swing freely under the action of gravity and function as a pendulum c) at least one driver coupled to said at least on leg system to drive pendular motion of said at least one leg system; and d) at least one support to support said at least one leg system.

12. The roping practice system according to claim 11 wherein said at least one driver comprises at least one electric motor.

13. The roping practice system according to claim 12 wherein said at least one electric motor comprises at least one battery.

* * * * *